3,281,520
ELECTRIC DISCHARGE PROTECTION FOR CONDUCTIVE BODIES BURIED UNDERGROUND
Yves A. Rocard, 87 Blvd. St. Michel, Paris, France
Filed Oct. 1, 1962, Ser. No. 227,332
6 Claims. (Cl. 174—6)

The present invention appertains to a novel protection apparatus and method capable of diverting electric discharges or the currents thereof from an area or object to be protected or shielded.

Essentially, an array of electrical paths, exhibiting low resistance relative to the medium in which the object to be protected is disposed, is provided between the object and the discharge medium. A transfer or collector lead, in electrical connection with the array, extends remotely thereof such that the destructive energy of the discharge is shunted away from the object over the common low resistance path.

Lately, the number of underground shelters developed as protection from the indirect effects of bomb, particularly of the atomic or thermonuclear type, is noticeably increasing in many parts of the world. Such shelters are usually entirely embedded in the earth which, of course, serves as the ground for atmospheric discharges including lightning and the like. Many of the shelters are constructed wholly or in part of metal having a resistance much lower than the surrounding earth and, consequently, currents from heavy discharges are prone to penetrate or follow the shelter casing causing destruction and harm to occupants.

Other type underground metallic installations which are protectible by the present invention consist of storage reservoirs, underground communication headquarters, power plants, safety vaults for valuable papers, and other functional facilities which it is desired to preserve intact during any type catastrophe.

In addition, the invention may be employed to protect extensive networks such as powerful electrical or telecommunication cables from direct hits or from induced currents.

The invention shields against all types of discharges, including not only the usual atmospheric discharge as a result of the naturally developed electrostatic forces but also the electric effects of nuclear explosions which are capable of producing tremendous charge distributions. Moreover, the principles of the invention are applicable to many type mediums and, in one respect, the invention may be viewed as a protection arrangement capable of being embedded in an electrode of a discharge producing field for protecting an object also disposed in such electrode, but in a direction away from the field or other electrode.

It also may be appreciated that the earth may be considered as one electrode of an electrostatic field established in the atmosphere with the other electrode being, e.g., a layer of clouds or the like. Then the apparatus of the present invention would be deployed on the surface of or in the earth above the object to be protected such that a heavy current resulting from an atmospheric discharge would be harmlessly directed away from the object by a collective path having substantially lower resistance than that of the earth.

Accordingly, the method invention consists in the deployment of a protective array at a location relative to the object as to afford protection. The apparatus in accordance with the invention may consist of an array in the form of a mesh or comb network of conducting wires, cables or bars, preferably regular and of simple shape as, for example, square or triangular, to facilitate the construction thereof. The mesh or comb is terminated in or connected to a conductive cable or wire which extends remotely therefrom in the same medium and is well embedded or "grounded" at its remote end to provide a pathway from the array for the heavy discharge current, the network itself covering the area to be protected.

Protection is assured if the network itself more than covers the area of the object and if the mesh dimension is appreciably smaller than the underground depth of the object to be protected and also if the resistance offered by the mesh and its cable outlet is appreciably smaller than the resistance of the earth along a vertical line from the surface to the object to be protected.

If, for example, the mesh network is made of copper conductors and the aforementioned conditions are met, the current from the discharge will, in fact, follow a path through the copper mesh and along the ground terminal to the remote "grounded" location rather than strike the protected object because of the lower resistance path presented by the copper. In the case of atomic or thermonuclear bombs, an explosion near the ground, for example, at an altitude of 1,000 feet or so, will ionize the air in the region between the burst and the ground and produce similar effects to a lightning discharge. However, the current developed in the ground appears at the intersection of the ground and the sphere of ionized air created by the explosion. In this event, the mesh or comb network enables a low resistance path for electrons from the earth at the remote ground connection to the intersection. Of course, the induced voltage in the ground is thus much weaker and the protection of the object is assured. It is therefore seen that it is preferable that the protecting network extend beyond the object to be protected, substantially to conform to the radius of the ball of the fire of the bomb assuming, of course, the worst possible condition, namely, an explosion directly above the facility to be protected.

Considering now a specific example, assume that for very dry ground the resistance of a segment having a cross-sectional dimension of 100 meters on a side is approximately the same as that of a copper wire having a diameter of 1 mm. Then it may be seen that in such ground a mesh network of copper wire of 1 mm. diameter with the mesh extending for 100 meters per side, would carry all of the electrons extracted from the ground. Thus, a mesh network of 1 mm. diameter wires which measures 10 meters on either side would effect protection for all objects buried for more than 5 meters in the ground. It follows that if the object to be protected is nearer the surface the dimensions of the mesh would be proportionately reduced.

Considering now a highly conductive "ground" such as sea water, the resistance may be of the order of 3 ohms per square meter per meter. Then a mesh network having copper wires of, for example, $1.7 \times 10^{-6}$ ohms per square centimeter per centimeter should approximate the equivalent resistance. Therefore, one square millimeter of copper is equal to approximately 300/1.7 or 170 square meters of sea water, equivalent to a square of 13 meters on each side. Thus a mesh network of copper wires, each having a cross section of one square millimeter and extending beyond the mesh one or two meters along each side, positioned at the surface of the sea and in contact therewith would assure sufficient protection of immersed metallic objects therebelow. This is partially due to the fact that in sea water the current is concentrated on the surface due to the skin effect.

For moderately conducting soil having a resistance intermediate that of the aforementioned examples, a mesh network which is quite simple and inexpensive may be utilized in similar manner.

With the foregoing in mind, it is an object of this invention to provide a method of, and apparatus for, protecting embedded or submerged objects.

It is a further object to provide a method and apparatus for diverting the effects of electric discharges remotely of facilities to be protected.

A still further object of the invention is the provision of apparatus for shielding objects of various configurations which have a greater conductivity than the medium in which they are disposed.

The invention will now be described in connection with its application to an object buried in the earth, as is more particularly illustrated in the drawing wherein.

Figure 1:
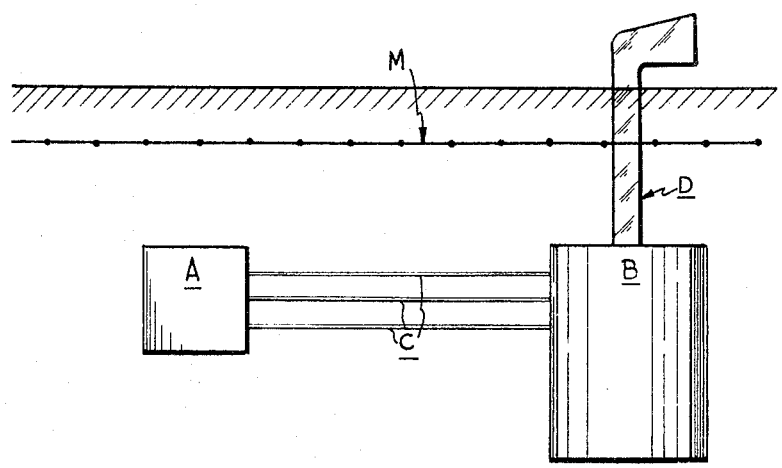
FIG. 1 is an elevational symbolic showing of a facility buried under the surface of the ground and shielded in accordance with the teaching herein.

In FIG. 1 a typical personnel shelter or control post is depicted at A connected to a power house or buried generation station B by way of a network of electrical or fluid ducts C essential to a working connection between structures A and B. A protective array is shown in the form of a mesh M (better seen in FIG. 2) buried just under the surface of the ground.

A ceramic or other non-conductive stack D is shown extending above the ground level and in communication with the shelter B to provide for air intake. The stack D penetrates the mesh M by way of an interstice (best shown in FIG. 2).

Figure 2:
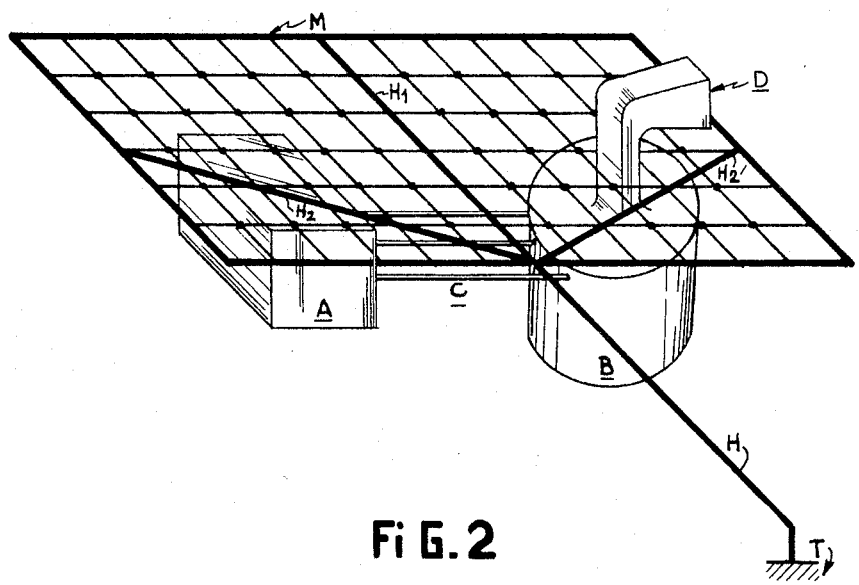
FIG. 2 is a view in perspective of the arrangement of FIG. 1 showing in greater detail the protective mesh array.

A thick cable H (FIG. 2) soldered to or otherwise in good contact with the mesh network M, extends to an earth or ground connection at the remote point T, say, for example, one or more miles away or at least sufficiently remote that the release to ground of a large current at point T would have no harmful effects on the structure of FIGS. 1 and 2 or personnel housed therein. The ground T may comprise wet soil, underground water or even a conventional earth anchor for establishing extensive contact with the earth.

In order to minimize the resistance of the array, the cross-sectional area of cable H should equal the sum total of all the cross-sectional areas of the mesh conductors (assuming like materials) capable of handling current. It is also desirable to deploy heavier conductors around the perimeter of the mesh and at various or random locations thereon, such as is exhibited by conductors H1, H2 and H2′, in order to assure total protection which may be descriptively regarded as an "electric protective carpet."

Figures 3, 4:
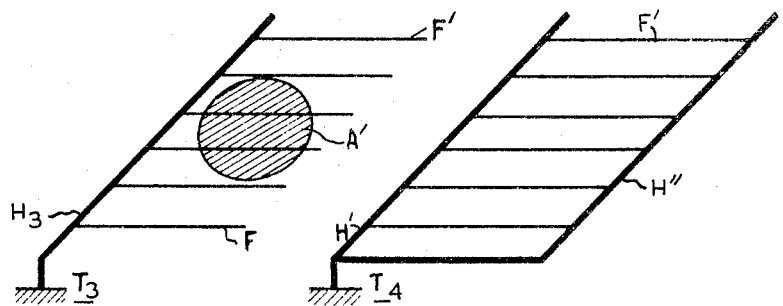
FIG. 3 is an alternative array of the comb variety illustrating the applicability of the principles herein set forth.
FIGS. 4 and 5 represent configurations having undesirable characteristics because of paths established for circulation currents, and FIG. 6 discloses structure suitable as an alternate for the arrangements of FIGS. 4 and 5 to provide a desirable electrical shield.

In FIG. 3 there is illustrated a protective array in the form of a comb which is, for example, disposed on the surface of the earth in a position to protect the zone A′. This comb is rather simply formed by a ground or collector cable H3 having attached thereto and extending in spaced-apart relation therefrom the conductive wires F–F′ with the cable H3 being remotely grounded at the point T3. In the case of protection against atomic explosion, the array of FIG. 3 should extend beyond the area A′ to be protected. For example, if the area A′ comprises a circular area having a diameter of, say 140 meters up to 700 meters, the wires of the comb should project beyond A by about 30 or more meters in every direction.

It is interesting to note that in comparing the comb type array with the mesh type array, the latter device provides extra protection in the form of small induced circular currents which shield against variations of the magnetic field in the ground.

Figure 5:
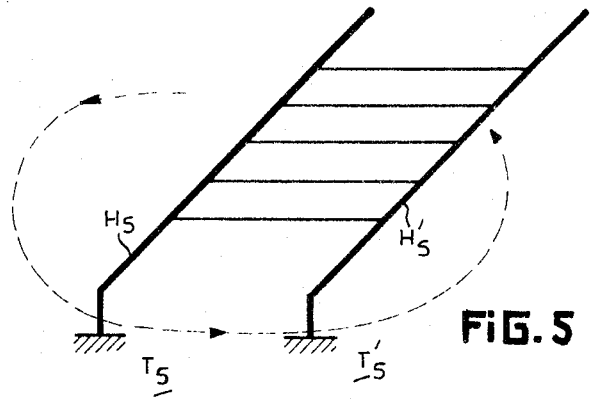

In FIGS. 4 and 5 there is shown array arrangements which are undesirable in that extremely large circulating currents may be developed which can cause damage in the objects intended to be protected. For example, in FIG. 4 a comb, similar to that of FIG. 3, includes the added heavy cable H″ in the form of a second collector reaching the common remote earth connection T4. The two collectors and the comb, including particularly conductor F′, constitute a large loop through which a heavy undesirable circulating current can pass.

The configuration of FIG. 5 shows a double grounded device having heavy current carriers H5 and H5′ respectively remotely grounded at T5 and T5′. Here again a large circulating current can be formed through the conductors H5 and H5′ and across the common ground T5 to T5′, thus exhibiting the undesirable effects of the FIG. 4 array.

Figure 6:
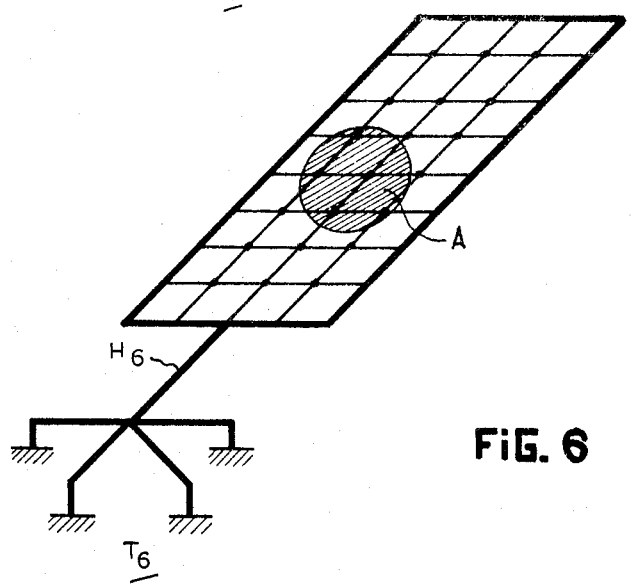

In FIG. 6 a mesh array is connected to the single large collector cable H6, grounded remotely at several good grounding points, generally illustrated at T6, but each at a great distance from the area to be protected. In this embodiment, there is no tendency to establish an undesirable large or heavy circulating current.

While the invention has been described in connection with a preferred application, it will be apparent to those skilled in the art that it is susceptible to many modifications within the principles taught herein and, accordingly, it is intended that the invention be limited only by the scope of the appended claims wherein:

I claim:

1. Apparatus for protecting a conductive body buried in the ground from the effects of atmospheric discharges comprising a conductive array disposed in the ground above and spaced from the body to be protected, said array having a greater area than the cross-section of, and extending beyond said body, collector means in electrical connection with the array and extending through the earth to a location remote from the body, means for grounding the collector means at said location, said array characterized by lower electrical resistance than the electrical resistance of the medium containing the array, said collector means having a total electrical resistance less than the total electrical resistance of said array, and said grounding location being a distance of thousands of feet from the body to leave the body free of the discharge effects.

2. A device for protecting a body disposed in the earth from the effects of phenomenon-type electrical discharges comprising a plurality of conductors deployed in a planar array extending beyond the body in all directions in its own plane and spaced therefrom in the earth above said body, the cross-sectional area of said conductors having an electrical resistance per unit length less than the electrical resistance per unit length of the cross-sectional area of the earth embedding the body to be protected, at least one collector conductor in electrical connection with the array and extending remotely thousands of feet therefrom to shunt the discharge effects away from the body, the current carrying capacity of said collector conductor at least equalling the sum of the individual current carrying capacities of the plurality of conductors.

3. The device of claim 2 wherein the array is in the form of a mesh.

4. The device of claim 2 wherein the array is in the form of a comb.

5. The device of claim 2 including further randomly disposed conductors affixed to the array in electrical connection therewith.

6. The device of claim 2 wherein the cross-sectional area of the collector conductor at least equals the sum of the cross-sectional areas of the individual conductors in the plurality.

References Cited by the Examiner

UNITED STATES PATENTS

| | | | |
|---|---|---|---|
| 407,660 | 7/1889 | Hill | 174—2 |
| 1,155,648 | 10/1915 | Dodd | 174—2 |
| 1,659,652 | 2/1928 | Hall | 174—2 |

LEWIS H. MYERS, *Primary Examiner.*

JOHN P. WILDMAN, JOHN F. BURNS, *Examiners.*

J. P. MOHN, D. L. CLAY, *Assistant Examiners.*